US008060097B1

(12) United States Patent
Rai et al.

(10) Patent No.: US 8,060,097 B1
(45) Date of Patent: Nov. 15, 2011

(54) METHOD AND APPARATUS FOR INTELLIGENT MOBILE-ASSISTED HARD HANDOFF

(75) Inventors: Deveshkumar Rai, Overland Park, KS (US); Manoj Shetty, Overland Park, KS (US); Sachin R Vargantwar, Overland Park, KS (US); Siddharth S Oroskar, Overland Park, KS (US); Debasish Sarkar, Irvine, CA (US)

(73) Assignee: Sprint Spectrum L.P., Overland Park, KS (US)

( * ) Notice: Subject to any disclaimer, the term of this patent is extended or adjusted under 35 U.S.C. 154(b) by 832 days.

(21) Appl. No.: 12/133,706

(22) Filed: Jun. 5, 2008

(51) Int. Cl.
*H04W 36/00* (2009.01)

(52) U.S. Cl. ..... 455/438; 455/436; 455/439; 455/67.11; 370/320; 370/389

(58) Field of Classification Search .................. 455/438, 455/436, 439
See application file for complete search history.

(56) References Cited

U.S. PATENT DOCUMENTS

2006/0274743 A1* 12/2006 Yegin et al. .................... 370/389
2008/0096581 A1* 4/2008 Do et al. .................... 455/456.2

FOREIGN PATENT DOCUMENTS

EP 1655986 A2 5/2006

OTHER PUBLICATIONS

Telecommunication Industry Association, Mobile Station-Base Station Compatibility Standard for Dual-Mode Spread Spectrum Systems, SP-3693-1 (to be published as TIA-EIA-95B), Oct. 31, 1998, Section 6.7.2.3.2.5 "Pilot Strength Measurement Message", pp. 6-487 to 6-489.

* cited by examiner

*Primary Examiner* — George Eng
*Assistant Examiner* — Chuck Huynh

(57) ABSTRACT

Methods and an apparatus are provided for providing handoff information to a candidate mobile node initially served on a first carrier. The candidate mobile node may inform a wireless-communication network that hard-handoff criteria are met for the first carrier. The network may identify a plurality of neighboring mobile nodes served on a second carrier and within a threshold distance of the candidate. The network may receive a measurement of forward-link signal quality of the second carrier from each neighboring mobile node. Using the received forward-link-signal-quality measurements, the network may estimate the forward-link signal quality of the second carrier at the location of the candidate mobile node. If that estimated forward-link signal quality exceeds a signal-quality threshold, the network may provide hard-handoff information about the second carrier to the candidate mobile node.

22 Claims, 5 Drawing Sheets

METHOD AND APPARATUS FOR INTELLIGENT MOBILE-ASSISTED HARD HANDOFF

BACKGROUND

Many people use mobile nodes, such as cell phones and personal digital assistants (PDAs), to communicate with and through wireless-communication networks. These mobile nodes and networks typically communicate over a radio-frequency (RF) air interface according to a wireless protocol such as Code Division Multiple Access (CDMA), perhaps in conformance with one or more industry specifications such as IS-95, IS-856, and IS-2000. Other protocols may be used as well, such as iDEN, TDMA, AMPS, GSM, GPRS, UMTS, EDGE, WiMAX (e.g., IEEE 802.16), LTE, microwave, satellite, MMDS, Wi-Fi (e.g., IEEE 802.11), and others now known or later developed.

In a typical wireless-communication network, a plurality of base stations are included, each of which defines one or more wireless coverage areas. A mobile node positioned in one of these wireless coverage areas can communicate over the RF air interface with the base station, which may provide the mobile node access to one or more circuit-switched, packet-switched, and/or other transport networks.

Mobile nodes and base stations conduct communication sessions (e.g. voice calls and data sessions) over frequencies known as carriers. A base station may provide service in a given wireless coverage area on one or more carriers. The communication from the wireless-communication network to a given mobile node are said to occur on a forward link, while those from a given mobile node to the wireless-communication network are said to occur on a reverse link. A typical mobile node periodically measures the strength of the carrier to determine a signal strength of the forward link.

A mobile node may travel between wireless coverage areas; for example, the mobile node may begin a wireless communication session in a first wireless coverage area and subsequently leave the first wireless coverage area. While the mobile node is being served in the first wireless coverage area, the mobile node may be served on a first carrier. As the mobile node leaves the first wireless coverage area, the mobile node may determine that the signal strength of the first carrier is relatively low.

Upon determining the signal strength of the first carrier is relatively low, the mobile node may request that the wireless-communication network perform a "handoff"; that is, a transfer of service between from the first carrier to a second carrier during a communication session. In particular, a "hard handoff" involves transferring the mobile node from the first carrier before establishing service on the second carrier while maintaining the communication session. In contrast, a "soft handoff" transfers the mobile node from the first carrier after establishing service on the second carrier while maintaining the communication session. After the handoff is performed, the mobile node is served on the second carrier.

OVERVIEW

Initially, a mobile node known as a candidate mobile node may be served by a first carrier in a first wireless coverage area of a wireless-communication network. The candidate mobile node may detect that the signal strength of the first carrier is relatively low. Subsequently, the candidate mobile node may request a handoff by sending a "hard-handoff-criteria-met indication" to the wireless-communication network. In this fashion, the wireless-communication network may determine hard-handoff criteria are met for the candidate mobile node.

The network may include a base station that operates on a second carrier to serve a plurality of mobile nodes. When the network receives the hard-handoff-criteria-met indication from the candidate mobile node, the network may locate the candidate mobile node. The network may locate the candidate mobile node either based on information sent in the hard-handoff-criteria-met indication or by tracking the candidate mobile node, as examples.

After locating the mobile node, the network may identify a plurality of neighboring mobile nodes that (i) neighbor the candidate mobile node and (ii) are served on the second carrier. Each mobile node in the plurality of neighboring mobile nodes may measure a signal strength of the second carrier and then indicate the signal-strength measurement via a "forward-link signal quality measurement" to the base station. As such, the base station may receive a plurality of forward-link signal quality indications (with respect to the second carrier) from the plurality of neighboring mobile nodes.

The network may estimate the signal strength of the second carrier at the location of the candidate mobile node. The estimated signal strength may be based on the received plurality of forward-link signal quality indications (from the neighboring mobile nodes). If the estimated signal strength is relatively strong, the network (via the base station) may send a "hard-handoff indication" to the candidate mobile node. The hard-handoff indication provides information about the second carrier. The candidate mobile node may use the information in the hard-handoff indication to handoff from the first carrier to the second carrier.

These as well as other aspects and advantages will become apparent to those of ordinary skill in the art by reading the following detailed description, with reference where appropriate to the accompanying drawings. Further, it is to be understood that this overview and other descriptions provided herein do not necessarily limit the invention but are instead provided as examples only. Moreover, while the instant application refers to procedures for hard handoffs of mobile nodes, the invention could be used for soft handoffs as well. Furthermore, one or more of the steps described above and herein may be carried out by one or more network entities, including but not limited to one or more base stations.

BRIEF DESCRIPTION OF THE DRAWINGS

Exemplary embodiments of the present invention are described herein with reference to the drawings, in which.

DETAILED DESCRIPTION

1. Exemplary Architecture

Figure 1:
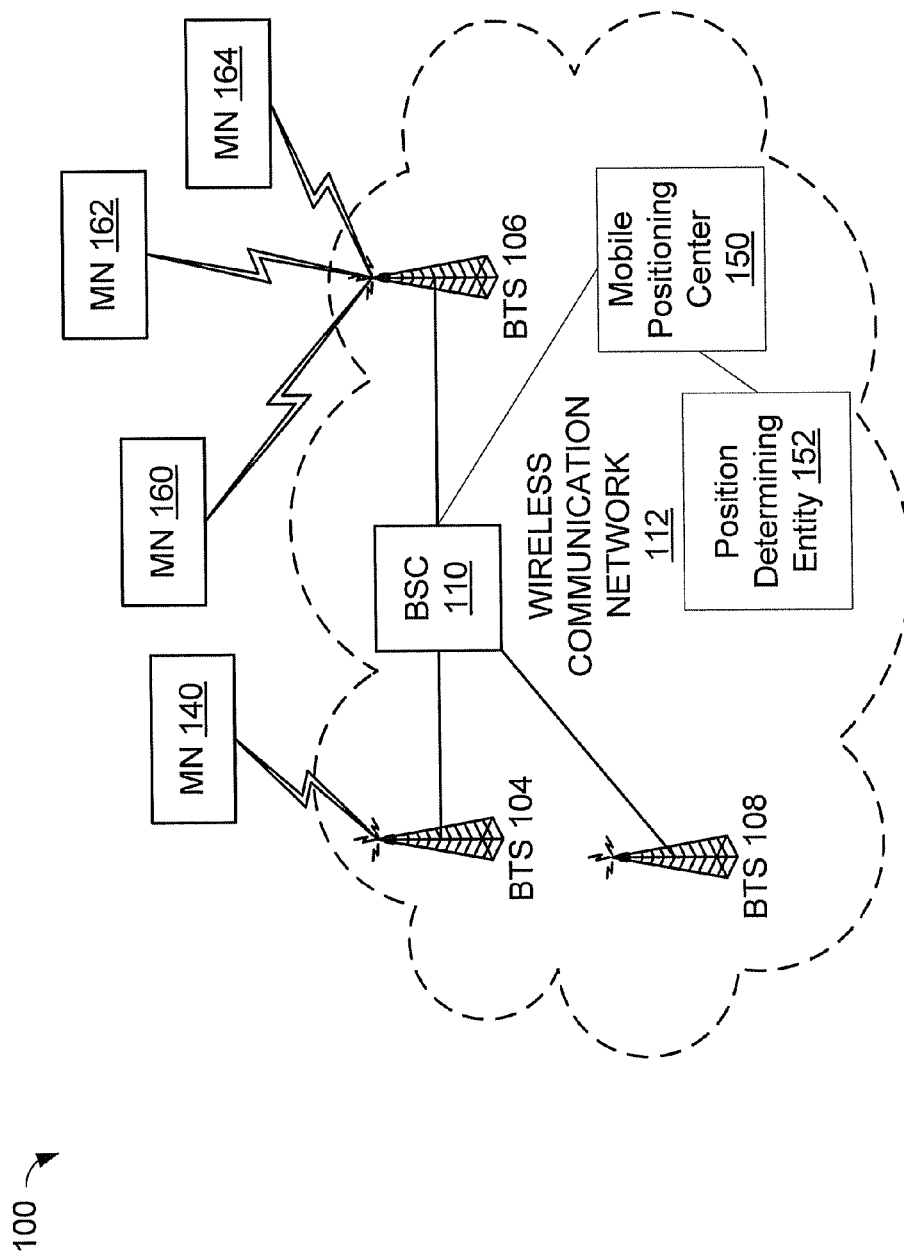
FIG. 1 shows an exemplary wireless-communication network that includes a plurality of mobile nodes communicating within a plurality of wireless coverage areas, in accordance with exemplary embodiments.

As shown in FIG. 1, a communication system 100 comprises a wireless-communication network 112 that includes a plurality of base transceiver stations (BTSs) 104, 106, and 108 to serve mobile nodes (MNs) 140, 160, 162, and 164. It should be understood, of course, that variations from this and other arrangements shown and described herein are possible. For instance, elements can be added, removed, combined, distributed, re-ordered, or otherwise modified. Further, it should be understood that functions described herein as being carried out by one or more entities can be carried out by one or more suitably programmed processors or by any combination of hardware, software, and/or firmware.

The BTSs 104-108 are controlled by a base station controller (BSC) 110 and operate according to any air-interface protocol now known or later developed, examples of which include CDMA (e.g., 1xRTT, 1xEV-DO), iDEN, TDMA, AMPS, GSM, GPRS, UMTS, EDGE, WiMAX, LTE, microwave, satellite, MMDS, Wi-Fi and Bluetooth. BTSs 104-108 may be any network element arranged to carry out the BTS functions described herein. As such, each of BTSs 104-108 may include a communication interface, a processor, and data storage comprising instructions executable by the processor to carry out those BTS functions. The communication interface may include one or more antennas, chipsets, and/or other components for providing one or more CDMA coverage areas such as cells and sectors, for communicating with mobile nodes (MNs), such as mobile node 140, over an air interface. The communication interface may also include one or more wired and/or wireless interfaces for communicating with at least BSC 110. As an example, a wired Ethernet interface may be included.

BSC 110 may be any network element arranged to carry out the BSC functions described herein. In general, BSC 110 functions to control one or more BTSs such as BTS 104, and to provide a communication link for those BTSs to other network entities, such as MSCs and PDSNs. As such, BSC 110 may include a communication interface, a processor, and data storage comprising instructions executable by the processor to carry out those BSC functions. The communication interface may include one or more wired and/or wireless interfaces for communicating with at least BTSs 104-108, as well as one or more other network entities, such as MSCs, PDSNs, mobile positioning center 150, position determining entity 152, etc.

Note that the combination of a BTS and BSC 110 may be considered a base station. However, a BTS or BSC 110 could, taken alone, be considered a base station as well. Furthermore, a base station may be considered to be either or both of those devices, and perhaps make use of one or more functions another entity, without departing from the scope or spirit of the present invention.

Mobile nodes 140, 160, 162, and 164 each may be any mobile device arranged to carry out the mobile-station functions described herein. As such, each of the mobile nodes 140-164 may include a user interface, a wireless-communication interface, a processor, and data storage comprising instructions executable by the processor for carrying out those mobile-station functions. The user interface may include buttons, a touch-screen, a microphone, and/or any other elements for receiving inputs, as well as a speaker, one or more displays, and/or any other elements for communicating outputs.

The wireless-communication interface may comprise an antenna and a chipset for communicating with one or more base stations over an air interface. As an example, the chipset could be one that is suitable for CDMA communication. The chipset or wireless-communication interface in general may also be able to communicate with other types of networks and devices, such as EV-DO networks, Wi-Fi networks, WiMax networks, Bluetooth devices, and/or one or more additional types of wireless devices or networks. The processor and data storage may be any suitable components known to those of skill in the art. As examples, each of mobile nodes 140-164 could be or include a cell phone, a PDA, a computer, a laptop computer, a hybrid CDMA/EV-DO device, a multi-mode cellular/Wi-Fi device, a multi-mode cellular/WiMAX device, and/or a multi-mode cellular/Wi-Fi/WiMAX device.

Each BTS radiates one or more carriers, each carrier defining one or more wireless coverage areas for serving mobile nodes. While a mobile node is positioned in a wireless coverage area, the BTS can serve the mobile node over an RF air interface. FIG. 1 shows BTS 104 radiating to define a wireless coverage area to serve mobile node 140 and BTS 106 radiating to define a wireless coverage area to serve mobile nodes 160-164. Zero, one, or more than one mobile nodes may be served in a wireless coverage area of a BTS at any given time. For example, FIG. 1 shows zero mobile nodes being served in the wireless coverage area of BTS 108, one mobile node being served in the wireless coverage area of BTS 104, and three mobile nodes being served in the wireless coverage area of BTS 106.

Note that a mobile node may move between wireless coverage areas while being served by the wireless-communication network 112. For example, BTS 104 may serve mobile node 140 as long as mobile node 140 is in a wireless coverage area of BTS 104. If mobile node 140 moves to another wireless coverage area, the mobile node 140 may be served by a different BTS in the communication network 112. For example, if the mobile node 140 moves to the wireless coverage area of BTS 106, the mobile node 140 may be served by the BTS 106.

As a mobile node moves between wireless coverage areas of the wireless-communication network 112, the mobile node may determine that the strength of a carrier serving the mobile node or "signal quality" has diminished below a signal-quality threshold, and in some cases, a moving mobile node may not detect the carrier at all. Consequently, the mobile node may request a handoff from the wireless-communication network 112. Responsive to the request, the wireless-communication network 112 may handoff the mobile node and establish communication with the mobile node using a new carrier.

For example, if mobile node 104 is initially served by BTS 104 and moves toward BTS 106, mobile node 104 may determine the signal quality of the carrier from BTS 104 has diminished below a signal-quality threshold. At that time, mobile node 104 may request a handoff from the wireless-communication network. The wireless-communication network 112 may determine a new carrier can serve mobile node 104 and establish communication with mobile node 104 using the new carrier. The new carrier may be provided by BTS 104 or by a different BTS, such as BTS 106.

The wireless-communication network 112 may track geographical locations of mobile nodes served by the wireless-communication network 112. In one arrangement, the wireless-communication network comprises a "mobile positioning center" (MPC) 150 that is arranged to determine and report mobile-node locations to requesting entities. Mobile positioning center 150 may include or have access to a position determining entity (PDE) 152, which may operate to determine the location of a given mobile node based on (i) the center of the wireless coverage area in which the mobile node is currently operating and (ii) satellite-based positioning information provided by the mobile node.

When mobile positioning center 150 receives a location request, mobile positioning center 150 and/or position determining entity 152 may, in turn, determine the location of the mobile node. Mobile positioning center 150 may then return the determined location of the mobile node to the requesting entity. The determined location may include data derived from the determined location (such as mapping, routing, or street address information, for instance).

A location request to mobile positioning center 150 may seek either a general or specific indication of a mobile node's location. A general indication of the mobile node's location may be an indication of the wireless coverage area in which the mobile node is currently operating, such as the geographic location of a center of the wireless coverage area. A specific indication of the mobile node's location, on the other hand, could be a more precise indication of the geographic position of the mobile node itself.

To identify the wireless coverage area that is currently serving a mobile node, mobile positioning center 150 may send a "low accuracy" location request to wireless-communication network 112 currently serving the mobile node, and the wireless-communication network may respond with an indication of the wireless coverage area in which the mobile node is currently operating. To learn a more specific geographic position of the mobile node, on the other hand, mobile positioning center 150 may send a "high accuracy" location request to position determining entity 152. Position determining entity 152 may then send one or more high-accuracy location requests to wireless-communication network 112 and receive high-accuracy positioning data—such as positioning information that the mobile node receives from one or more satellites (e.g., Global Positioning System (GPS) satellites)—in response from the wireless-communication network 112. Position determining entity 152 may then use that high-accuracy positioning data, typically in combination with the cell/sector center determined by mobile positioning center 150 to identify the mobile node's geographic position. Once the mobile node's geographic position has been determined, mobile positioning center 150 and/or position determining entity 152 may indicate the node's geographic position to wireless-communication network 112.

2. An Exemplary Scenario

Figure 2:
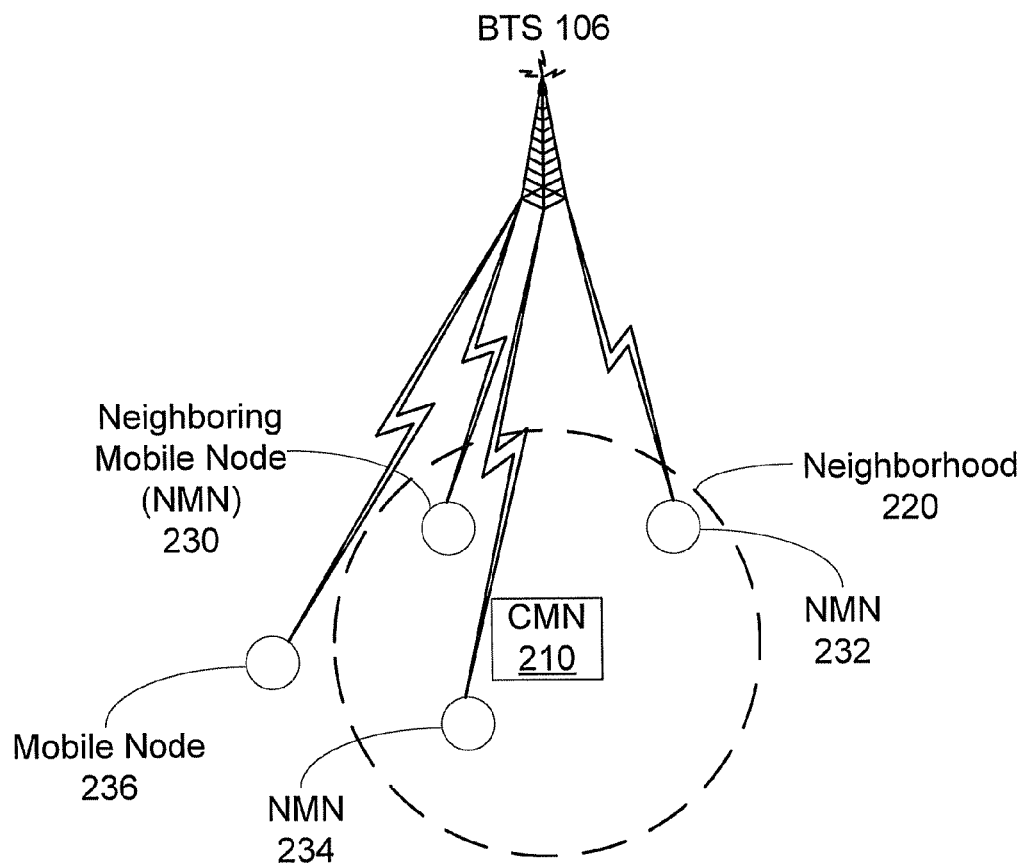
FIG. 2 shows a scenario where a base station is serving a plurality of neighboring mobile nodes near a candidate mobile node, in accordance with exemplary embodiments.

FIG. 2 shows a scenario where BTS 106 serves a plurality of neighboring mobile nodes (NMNs) 230, 232, and 234 near a candidate mobile node (CMN) 210. In this scenario, candidate mobile node 210 was previously served on a first carrier by a BTS other than BTS 106 and has recently entered a wireless coverage area of BTS 106.

At this time, candidate mobile node 210 may determine "hard-handoff criteria" have been met; that is, candidate mobile node 210 may determine the criteria to request a handoff have been met. To determine the hard-handoff criteria have been met, candidate mobile node 210 may measure a "forward-link signal quality" of the first carrier. The forward-link signal quality of a carrier is a measure of the strength of the carrier and/or a signal/noise ratio (e.g., carrier-to-interference ratio) of the carrier. Candidate mobile node 210 may determine that the forward-link signal quality has diminished below a signal-quality threshold and, as such, the hard-handoff criteria have been met. Subsequently, candidate mobile node 210 may send a handoff request to wireless-communication network 112. The handoff request may include an indication of the geographic location of candidate mobile node 210 and/or the measured forward-link signal quality of the first carrier.

BTS 106 may receive the handoff request from candidate mobile node 210 and then determine the location of candidate mobile node 210. BTS 106 may determine the location of candidate mobile node 210 either from an indication of the geographic location in the handoff request or from data determined by geographic-location tracking of candidate mobile node 210. Geographic-location tracking may be performed by mobile positioning center 150 and/or position determining entity 152.

BTS 106 may then determine a neighborhood 220 near candidate mobile node 210. The neighborhood 220 may an area centered at the geographic location of candidate mobile node 210. FIG. 2 shows neighborhood 220 as a circle centered at the geographic location of candidate mobile node 210, but neighborhood 220 may be an ellipse, polygon, or another shape altogether.

BTS 106 may then determine if one or more mobile nodes are within neighborhood 220. BTS 106 may determine that one or more neighboring mobile nodes are within neighborhood 220 by first requesting the geographic location from each mobile node within each wireless coverage area that includes the geographic location of candidate mobile node 210. Alternatively, BTS 106 may use data determined by tracking geographic location of mobile nodes in wireless coverage areas served by BTS 106, such as by mobile positioning center 150 and/or position determining entity 152.

BTS 106 may then determine the "neighboring distance" to determine the plurality of candidate mobile nodes. The neighboring distance, as used herein, is the distance between the candidate mobile node 210 and each mobile node within each wireless coverage area that includes the geographic location of candidate mobile node 210. BTS 106 may then compare the neighboring distance for each mobile node to a threshold distance to determine if a mobile node is within neighborhood 220. As examples, the threshold distance may be a value hardcoded into BTS 106 or determined by user input to BTS 106. Other techniques for determining a threshold distance are possible as well.

In the scenario of FIG. 2, BTS 106 uses a second carrier to serve four mobile nodes 230, 232, 234, and 236. Once BTS 106 determines the location of candidate mobile node 210, BTS 106 may determine the locations of the other mobile nodes served by BTS 106 within the wireless coverage area that includes the geographic location of candidate mobile node 210. BTS 106 may determine the location and the neighboring distance for each of mobile nodes 230, 232, 234, and 236. BTS 106 may compare each neighboring distance to a threshold distance (e.g., the radius of neighborhood 220) and determine mobile nodes 230, 232, and 234 are within neighborhood 220 and mobile node 236 is not within neighborhood 220.

In another embodiment of the invention, the plurality of neighboring mobile nodes may be the plurality of mobile nodes with the smallest neighboring distance (i.e., nearest to candidate mobile node 210). That is, the plurality of neighboring mobile nodes may be identified as a fixed number of mobile nodes and/or a percentage of mobile nodes with the smallest neighboring distance. For example, BTS 106 may determine that the plurality of neighboring mobile nodes for a given candidate mobile node are the three mobile nodes or the 10% of all mobile nodes served on the given carrier with the smallest neighboring distance. BTS 106 may use a combination of fixed numbers and percentages in determining the plurality of neighboring mobile nodes, such as determining the plurality of neighboring mobile nodes to be the 10% of the mobile nodes with the smallest neighboring distance served on a given carrier as long as there are at least three mobile nodes in the plurality of neighboring mobile nodes. And other possibilities exist as well.

If the plurality of neighboring mobile nodes is a fixed number of mobile nodes and/or a percentage of mobile nodes, the threshold distance may be the distance from candidate mobile node 210 to the neighboring mobile node farthest from candidate mobile node 210. That is, the threshold distance may be determined to be the largest (i.e., maximum) neighboring distance over all neighboring mobile nodes in the plurality of the neighboring mobile nodes.

Once BTS 106 has determined that mobile nodes 230, 232, and 234 are the plurality of neighboring mobile nodes, BTS 106 may request a measurement of the forward-link signal quality of the second carrier from each of neighboring mobile nodes 230, 232, and 234. Each neighboring mobile node 230, 232, and 234 may then send a measurement of the forward-link signal quality of the second carrier, as measured by each respective neighboring mobile node.

BTS 106 may then use the received measurements of forward-link signal quality to determine an estimated forward-link signal quality of the second carrier at the geographic location of candidate mobile node 210. For example, BTS 106 may estimate the forward-link signal quality of the second carrier as the received forward-link-signal-quality measurement of the neighboring mobile node closest to candidate mobile node 210 (e.g., neighboring mobile node 234), perhaps based on the neighboring distance between the neighboring mobile node and candidate mobile node 210. Other methods of estimation are possible as well; for example, BTS 106 may determine the estimated forward-link signal quality of the second carrier by selecting the maximum, minimum, median, or average of the received forward-link-signal-quality measurements, among numerous other possibilities.

BTS 106 may set a measurement timer to wait a first amount of time for forward-link-signal-quality measurements from the neighboring mobile nodes. If all neighboring mobile nodes do not provide a forward-link-signal-quality measurement before the measurement timer expires, BTS 106 may (a) wait a second fixed amount of time to receive the measurements, (b) wait for a number of measurements from the neighboring mobile nodes, where the number of measurements may be less that the number of neighboring mobile nodes, and/or (c) use the measurements received within the first amount of time. If no measurements are received by BTS 106 within the time allowed, BTS 106 may inform the candidate mobile node 210 that a handoff cannot be performed, not inform the candidate mobile node 210 that a handoff can be performed, use the herein-described methodology to determine a second set of neighboring mobile nodes served by BTS 106 on a third carrier and request measurements from the second set of neighboring mobile nodes, use another handoff methodology, and/or take some other course of action and/or inaction.

BTS 106 may compare the estimated forward-link signal quality of the second carrier at the geographic location of candidate mobile node 210 to a signal-quality threshold. As examples, the signal-quality threshold may be specified as a hardcoded value or by user input to BTS 106. In another embodiment, the signal-quality threshold may be the measured forward-link signal quality of the first carrier, if the measured forward-link signal quality is available to BTS 106 (e.g., if the measured forward-link signal quality of the first carrier was included in the handoff request or an indication that the hard-handoff criteria were met).

If the estimated forward-link signal quality of the second carrier at the geographic location of candidate mobile node 210 exceeds the signal-quality threshold, BTS 106 may provide "hard-handoff information" to candidate mobile node 210. The hard-handoff information may include an identifier of the second carrier, such as a pseudorandom-number (PN) offset, and/or frequency information about the second carrier. The candidate mobile node 210 may use the hard-handoff information to handoff to the second carrier.

Note that candidate mobile node 210 was not required to determine an estimate of the forward-link signal quality of the second carrier. As such, candidate mobile node 210 is not required to conduct a search for a new carrier (e.g., the second carrier), which may have caused candidate mobile node 210 to interrupt an ongoing communication session.

Estimating the forward-link signal quality of the second carrier based on measurements of mobile nodes served near candidate mobile node 210 allows a wireless-communication network to make an intelligent choice of carriers for candidate mobile node 210 based on more information than is available to candidate mobile node 210. As such, the wireless-communication network 112 may provide a stronger carrier to candidate mobile node 210 than candidate mobile node 210 may have otherwise chosen. And those of skill in the art will recognize advantages of implementing the present invention in addition to those mentioned herein.

3. An Exemplary Call Flow

Figure 3:
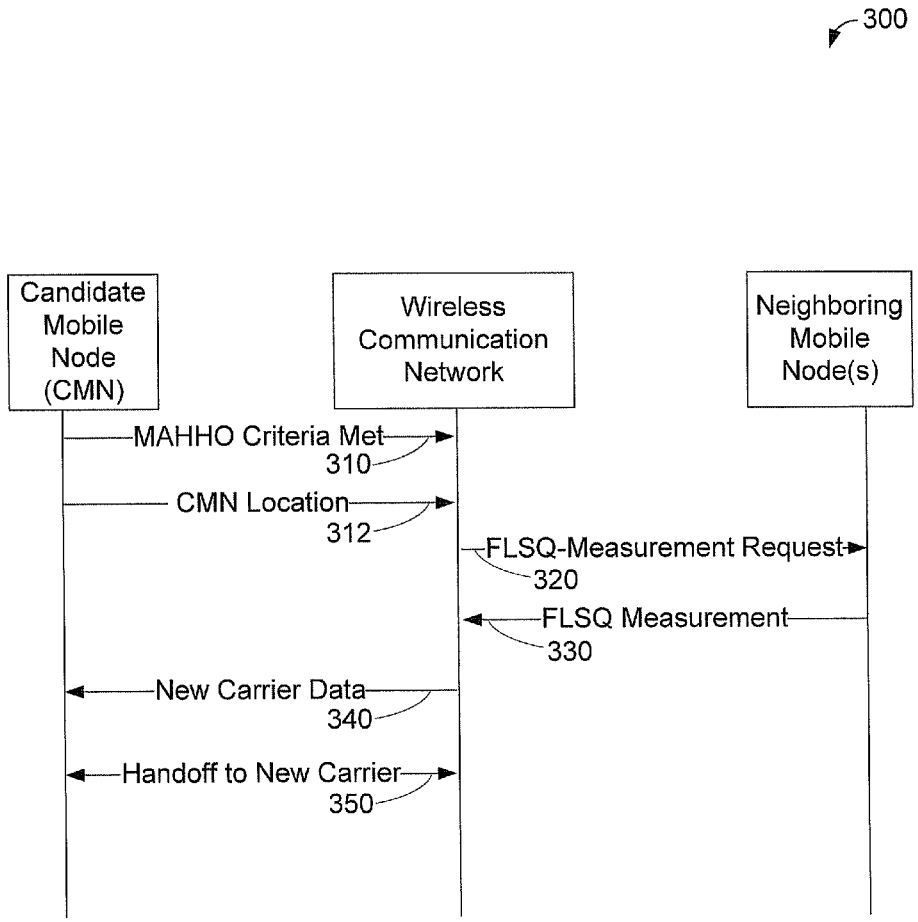
FIG. 3 depicts an exemplary call flow between a wireless-communication network, a candidate mobile node, and one or more neighboring mobile nodes, in accordance with exemplary embodiments.

FIG. 3 depicts an exemplary call flow 300 between a wireless-communication network (WCN), a candidate mobile node (CMN), and a neighboring mobile node (NMN), in accordance with exemplary embodiments. Alternate implementations are included within the scope of the example embodiments in which messages may be sent and/or received out of order from that shown or discussed, including substantially concurrently, using more or fewer messages than indicated, or in reverse order, depending on the functionality involved, as would be understood by those skilled in the art of the described embodiments.

Call flow 300 begins when the candidate mobile node, such as candidate mobile node 210, sends a message indicating that hard-handoff criteria are met to the wireless-communication network, such as wireless-communication network 112. As shown in FIG. 3, the message may be a mobile-assisted-hard-handoff (MAHHO) criteria-met message 310. The MAHHO-criteria-met message 310 may indicate a forward-link signal quality (FLSQ) of a first carrier, where the first carrier is initially used by the wireless-communication network to serve the candidate mobile node. An indication 312 of the geographic location of candidate mobile node may be sent as well. FIG. 3 shows the indication 312 of the geographic location of candidate mobile node as a separate message. In an embodiment of the invention, the indication 312 of the geographic location of candidate mobile node may be sent as a component of the MAHHO-criteria-met message 310. In another embodiment of the invention, the indication of the geographic location of candidate mobile node 312 may not be sent at all.

Upon reception of the MAHHO-criteria-met message 310 (and perhaps also the indication 312 of the geographic location of candidate mobile node), the wireless-communication network may identify a plurality of neighboring mobile nodes, such as neighboring mobile nodes 230-234, using the techniques described above in connection with FIG. 2. The wireless-communication network may serve the neighboring mobile nodes on a second carrier (different than the carrier serving the candidate mobile node).

To determine the signal quality of the second carrier, the wireless-communication network may send a forward-link-signal-quality-measurement request 320 to each neighboring mobile node in the plurality of neighboring mobile nodes. In response to the forward-link-signal-quality-measurement request 320, each neighboring mobile node in the plurality of neighboring mobile nodes may send a forward-link-signal-quality measurement 330 to the wireless-communication network. The forward-link-signal-quality measurement 330 from a given neighboring mobile node may comprise (i) an indication of the forward-link signal quality of the second carrier as measured by the given neighboring mobile node, and may also comprise (ii) an indication of the geographic location of the given neighboring mobile node. In particular, the forward-link-signal-quality measurement 330 may be included in a pilot signal measurement message (PSMM) as defined in the well-known TIA-EIA-95B standard. See Section 6.7.2.3.2.5, "Pilot Strength Measurement Message" in Telecommunication Industry Association (TIA), Mobile Station-Base Station Compatibility Standard for Dual-Mode Spread Spectrum Systems, SP-3693-1 (to be published as TIA-EIA-95B), Publish Version, Oct. 31, 1998, hereby incorporated by reference herein.

Upon reception of a plurality of forward-link-signal-quality measurements 330, the wireless-communication network may estimate a forward-link signal quality of the second carrier at the geographic location of the candidate mobile node, perhaps using the techniques described above in connection with FIG. 2. If the wireless-communication network determines that the candidate mobile node may be served on the second carrier, such as by determining that the estimated forward-link signal quality of the second carrier at the geographic location of candidate mobile node 210 exceeds a signal-quality threshold, the wireless-communication network may send new carrier data 340 to the candidate mobile node. The new carrier data 340 may comprise hard-handoff information, such as a PN offset of the second carrier and/or frequency information about the second carrier.

Once the candidate mobile node receives the new carrier data 340, the candidate mobile node may use the information in new carrier data 340 to handoff to the second carrier. FIG. 3 indicates the handoff to the second carrier as handoff-to-new-carrier message 350. The handoff-to-new-carrier message 350 may comprise an acknowledgement of new carrier data 340 and/or a forward-link-signal-quality measurement of the second carrier by the candidate mobile node, among other possibilities.

4. An Exemplary Method

Figure 4:
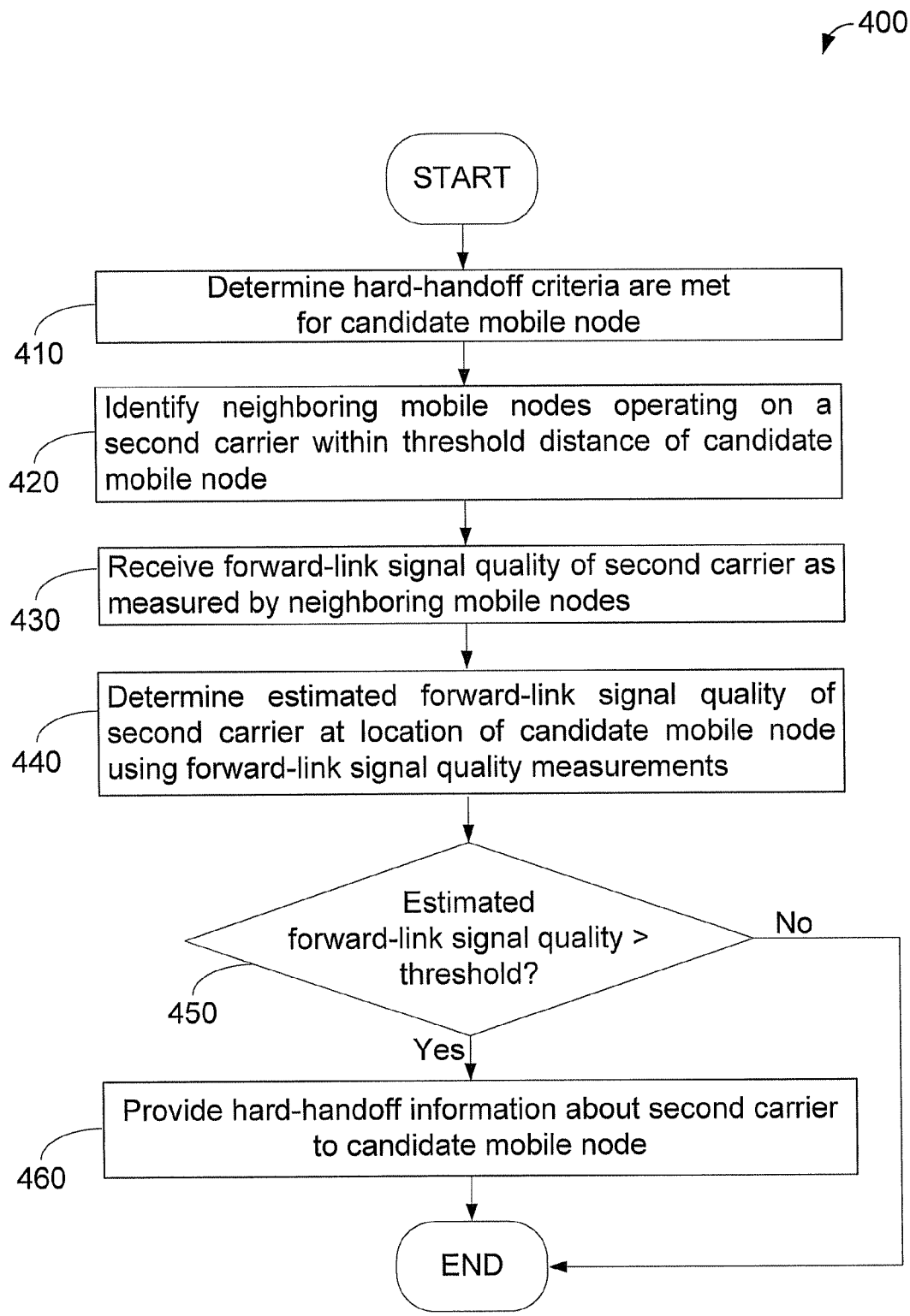
FIG. 4 is a flowchart of an exemplary method, in accordance with exemplary embodiments.

FIG. 4 is a flowchart of an exemplary method 400, in accordance with exemplary embodiments. It should be noted that method 400 and/or method 500 may be carried out by any combination of BTS 104-108, BSC 110, mobile positioning center 150, position determining entity 152, one or more mobile nodes, one or more other entities described herein, and/or one or more other entities not described herein, without departing from the scope and spirit of the present invention.

It should be understood that each block in this flowchart and within other flowcharts presented herein may represent a module, segment, or portion of computer program code, which includes one or more executable instructions for implementing specific logical functions or steps in the process. Alternate implementations are included within the scope of the example embodiments in which functions may be executed out of order from that shown or discussed, including substantially concurrently or in reverse order, depending on the functionality involved, as would be understood by those skilled in the art of the described embodiments.

In particular, FIG. 4 depicts a method 400. The candidate mobile node is initially served by wireless-communication network 112 on a first carrier.

At block 410, it is determined that hard-handoff criteria are met for the candidate mobile node. The candidate mobile node may determine hard-handoff criteria are met by (i) measuring the forward-link signal quality of the first carrier and (ii) determining that the measured forward-link signal quality of the first carrier is less than a threshold. In some scenarios, the candidate mobile node may determine the hard-handoff criteria are met by failing to detect the first carrier. And other possibilities exist as well.

The candidate mobile node may indicate that the hard-handoff criteria are met by sending a MAHHO-criteria-met message 310 to the wireless-communication network 112. The candidate mobile node may indicate a forward-link-signal-quality measurement of the first carrier as part of the MAHHO-criteria-met message 310.

The candidate mobile node may send an indication of its geographic location to the wireless-communication network 112; the candidate mobile node may send this indication with MAHHO-criteria-met message 310 and/or in a separate message. In an embodiment of the invention, the candidate mobile node may not indicate its geographic location; for example, no indication of the geographic location of the candidate mobile node may be sent by the candidate mobile node if the wireless-communication network 112 tracks the location of the candidate mobile node.

At block 420, one or more neighboring mobile nodes are identified. Each neighboring mobile node both (i) communicates with the wireless-communication network 112 on a second carrier and (ii) is located within a threshold distance of the candidate mobile node. The threshold distance may be determined based on user input to the wireless-communication network or be a hardcoded value for the threshold distance, as examples. In an embodiment of the invention, the wireless-communication network may determine that a fixed number and/or a percentage of mobile nodes served on the second carrier are identified as the neighboring mobile nodes, and, as such, the threshold distance may be determined to be a distance to the neighboring mobile node farthest from the candidate mobile node. Preferably, the second carrier is different than the first carrier.

At block 430, a measurement of forward-link signal quality of the second carrier as determined at each respective neighboring mobile node is received from each neighboring mobile node. The wireless-communication network may send a message, such as forward-link-signal-quality-measurement request 320, to each neighboring mobile node to request the measurement of the forward-link signal quality of the second carrier. In response, each respective neighboring mobile node may measure the forward-link signal quality of the second carrier and send a message (e.g., a PSMM) that conveys the forward-link-signal-quality measurement of the second carrier to the wireless-communication network.

If each respective neighboring mobile node does not send the measurement of the forward-link signal quality of the second carrier, the method 400 may proceed to block 440 after waiting for an amount of time and/or receipt of a number of measurements from the neighboring mobile nodes of the forward-link signal quality of the second carrier.

At block 440, an estimated forward-link signal quality of the second carrier at the location of the candidate mobile node is determined using the one or more received forward-link-signal-quality measurements. The estimated forward-link signal quality may be determined using a received forward-link-signal-quality measurement of the neighboring mobile node closest to candidate mobile node, averaging the received forward-link-signal-quality measurements, using the maximum received forward-link-signal-quality measurement, using the minimum received forward-link-signal-quality measurement, using the median received forward-link-signal-quality measurement, or by some other estimation technique.

At block 450, it is determined whether the estimated forward-link signal quality of the second carrier at the location of the candidate mobile node exceeds a signal-quality threshold. The signal-quality threshold may be determined based on user input to the wireless-communication network or may be determined based on the forward-link signal quality of the first carrier as measured by the candidate mobile node, among numerous possibilities.

If the estimated forward-link signal quality exceeds the signal-quality threshold, method 400 proceeds to block 460. If not, method 400 ends. At block 460, hard-handoff information about the second carrier is provided to the candidate mobile node. The hard-handoff information may comprise a PN offset of the second carrier and/or frequency information about the second carrier. After completing block 460, method 400 ends.

5. Another Exemplary Method

Figure 5:
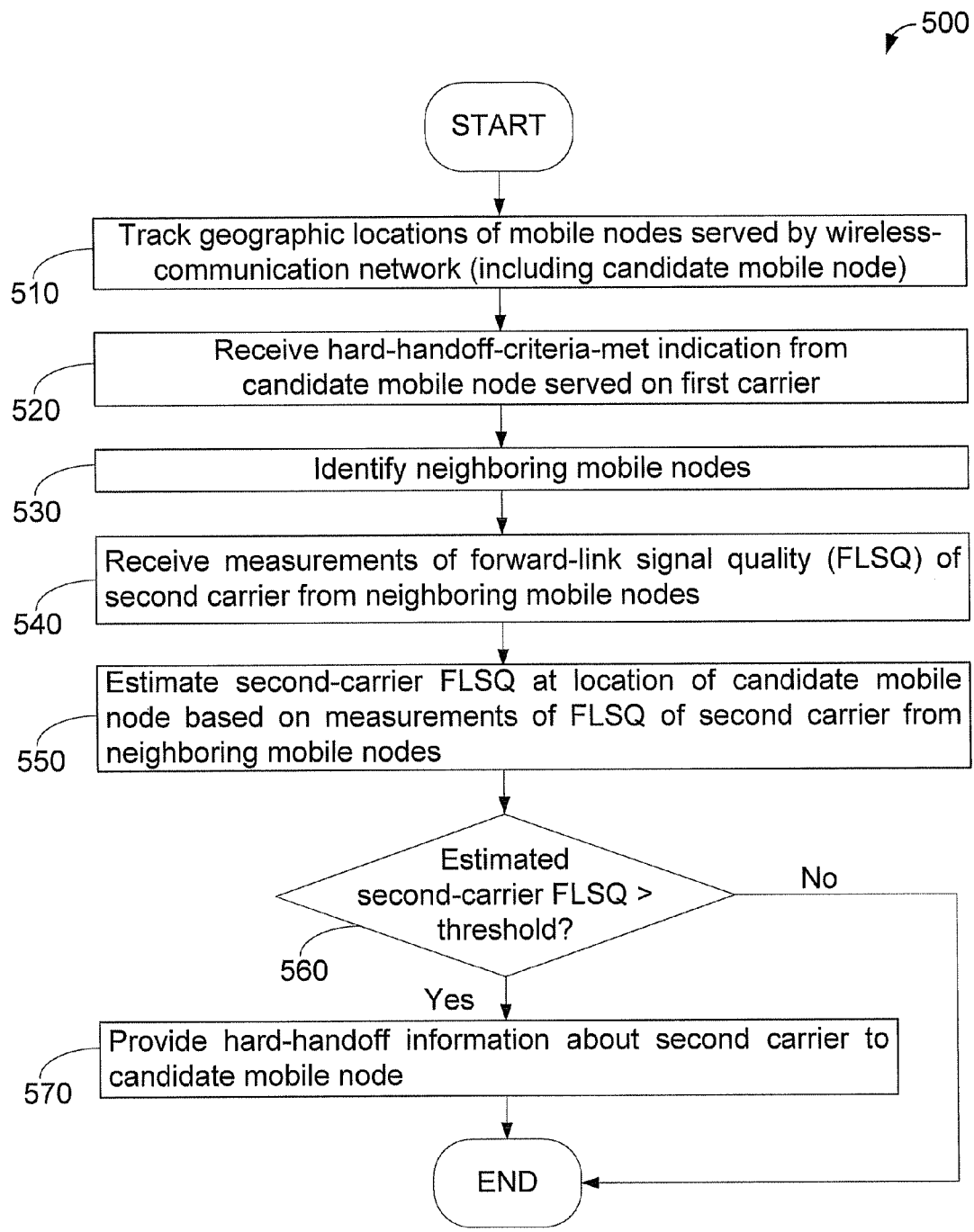
FIG. 5 is a flowchart of an exemplary method, in accordance with exemplary embodiments.

FIG. 5 is a flowchart of an exemplary method 500, in accordance with exemplary embodiments. In particular, FIG. 5 depicts a method 500. The candidate mobile node is initially served by wireless-communication network 112 on a first carrier. A plurality of other mobile nodes is served by wireless-communication network 112 on a second carrier.

At block 510, the geographic locations of the plurality of mobile nodes, including the candidate mobile node, are tracked. The wireless-communication network may track the geographic location of mobile nodes served by the wireless-communication network using network entities such as mobile positioning center 150 and/or position determining entity 152.

At block 520, a hard-handoff-criteria-met indication is received from the candidate mobile node. The candidate mobile node may determine hard-handoff criteria are met by (i) measuring the forward-link signal quality of the first carrier and (ii) determining that the measured forward-link signal quality of the first carrier is less than a threshold. In some scenarios, the candidate mobile node may determine hard-handoff criteria are met by failing to detect the first carrier.

The candidate mobile node may indicate that the hard-handoff criteria are met by sending a MAHHO-criteria-met message 310 to the wireless-communication network 112. The candidate mobile node may include a forward-link-signal-quality measurement of the first carrier as part of the MAHHO-criteria-met message 310.

At block 530, a plurality of neighboring mobile nodes is identified among the plurality of other mobile nodes. The plurality of neighboring mobile nodes may be identified based on a comparison between a geographic location of the candidate mobile node and geographic locations of the other mobile nodes.

A mobile node in the plurality of other mobile nodes is identified as a neighboring mobile node if the mobile node is located within a threshold distance of the candidate mobile node. The threshold distance may be determined based on user input to the wireless-communication network or be a hardcoded value, as examples. In some embodiments, the wireless-communication network may determine that a fixed number and/or a percentage of mobile nodes served on the second carrier are identified as the neighboring mobile nodes, and, as such, the threshold distance may be determined to be a distance to the neighboring mobile node that is farthest from the candidate mobile node. Preferably, the second carrier is different than the first carrier.

At block 540, a plurality of measurements of forward-link signal quality of a second carrier are received from at least the plurality of neighboring mobile nodes. Each respective neighboring mobile node may send a message (e.g., a PSMM) that conveys a measurement of the forward-link signal quality of the second carrier, such as forward-link-signal-quality-measurement 330, to the wireless-communication network.

Measurements of the forward-link signal quality of the second carrier may be received from the other mobile nodes that are not in the plurality of neighboring mobile nodes. For example, each other mobile node may send a measurement of the forward-link signal quality of each carrier, including the second carrier, received by the mobile node. These measurements may be sent periodically and/or upon request, as examples.

At block 550, a forward-link signal quality of the second carrier at the geographic location of the candidate mobile node is estimated, based on the plurality of measurements of the forward-link signal quality of the second carrier received from the neighboring mobile nodes.

The forward-link signal quality of the second carrier may be estimated using a received forward-link-signal-quality measurement of the neighboring mobile node closest to candidate mobile node, averaging the received forward-link-signal-quality measurements, using the maximum received forward-link-signal-quality measurement, using the minimum received forward-link-signal-quality measurement, using the median received forward-link-signal-quality measurement, or by some other technique.

At block 560, it is determined whether the estimated forward-link signal quality of the second carrier at the location of the candidate mobile node exceeds a signal-quality threshold. The signal-quality threshold may be determined based on user input to the wireless-communication network or may be determined based on the forward-link signal quality of the first carrier as measured by the candidate mobile node, among numerous possibilities.

If the estimated forward-link signal quality exceeds the signal-quality threshold, method 500 proceeds to block 570. If not, method 500 ends. At block 570, hard-handoff information about the second carrier is provided to the candidate mobile node. The hard-handoff information may comprise a PN offset of the second carrier, and/or frequency information about the second carrier. After completing block 570, method 500 ends.

6. Conclusion

Various exemplary embodiments have been described above. Those skilled in the art will understand, however, that changes and modifications may be made to those examples without departing from the scope of the claims.

What is claimed is:

1. In a wireless-communication network defining a plurality of wireless coverage areas for serving a plurality of mobile nodes on a plurality of carriers, wherein the wireless-communication network initially serves a candidate mobile node on a first carrier, a method comprising:

determining that hard-handoff criteria are met for the candidate mobile node;

identifying one or more neighboring mobile nodes, wherein each neighboring mobile node (i) communicates with the wireless-communication network on a second carrier and (ii) is located within a threshold distance of a location of the candidate mobile node;

receiving, from each neighboring mobile node, a measurement of a forward-link signal quality of the second carrier as determined at each respective neighboring mobile node;

using the one or more received forward-link-signal-quality-measurements to determine an estimated forward-link signal quality of the second carrier at the location of the candidate mobile node; and if the estimated forward-link signal quality of the second carrier at the location of the candidate mobile node exceeds a signal-quality threshold, providing hard-handoff information about the second carrier to the candidate mobile node.

2. The method of claim 1, wherein the hard-handoff information about the second carrier is provided to the candidate mobile node without first receiving a measurement of the forward-link signal quality of the second carrier from the candidate mobile node.

3. The method of claim 1, wherein at least one forward-link-signal-quality measurement is conveyed using a pilot strength measurement message (PSMM).

4. The method of claim 1, further comprising determining the location of the candidate mobile node using Global Positioning System (GPS) technology.

5. The method of claim 1, wherein determining that hard-handoff criteria are met for the candidate mobile node comprises receiving, from the candidate mobile node, a hard-handoff-criteria-met indication.

6. The method of claim 5, wherein the hard-handoff-criteria-met indication comprises the location of the candidate mobile node.

7. The method of claim 5, wherein the hard-handoff-criteria-met indication comprises a measurement of a forward-link signal quality of the first carrier as determined at the candidate mobile node.

8. The method of claim 7, wherein the signal-quality threshold is the measurement of the forward-link signal quality of the first carrier.

9. The method of claim 1, wherein the threshold distance is determined by use of at least one of: (i) received user input, (ii) a hardcoded value, (iii) a largest neighboring distance of a neighboring mobile node in the plurality of the neighboring mobile nodes, wherein the plurality of neighboring mobile nodes consists of a fixed number of mobile nodes closest to the candidate mobile node and communicating using the second carrier, and (iv) a largest neighboring distance of a neighboring mobile node in the plurality of the neighboring mobile nodes, wherein the plurality of neighboring mobile nodes consists of a percentage of mobile nodes closest to the candidate mobile node and communicating using the second carrier.

10. The method of claim 1, wherein using the one or more received forward-link-signal-quality measurements to determine an estimated forward-link signal quality of the second carrier at the location of the candidate mobile node comprises determining an estimated forward-link signal quality by at least one of: (i) determining an average of the received forward-link-signal-quality measurements, (ii) determining a minimum of the received forward-link-signal-quality measurements, (iii) determining a maximum of the received forward-link-signal-quality measurements, (iv) determining a median of the received forward-link-signal-quality measurements, and (v) determining a forward-link signal quality of a neighboring mobile node closest to the candidate mobile node.

11. A base station, comprising:

a processing unit;

data storage;

radio-frequency equipment operable to communicate with a plurality of mobile nodes; and machine-language instructions stored in the data storage and executable by the processing unit to perform functions including:

determining that hard-handoff criteria are met for the candidate mobile node;

identifying one or more neighboring mobile nodes, wherein each neighboring mobile node (i) communicates with the wireless-communication network on a second carrier and (ii) is located within a threshold distance of a location of the candidate mobile node;

receiving, from each neighboring mobile node, a measurement of a forward-link signal quality of the second carrier as determined at each respective neighboring mobile node;

using the one or more received forward-link-signal-quality measurements to determine an estimated forward-link signal quality of the second carrier at the location of the candidate mobile node; and if the estimated forward-link signal quality of the second carrier at the location of the candidate mobile node exceeds a signal-quality threshold, providing hard-handoff information about the second carrier to the candidate mobile node.

12. The base station of claim 11, wherein the hard-handoff information about the second carrier is provided to the candidate mobile node without first receiving a measurement of the forward-link signal quality of the second carrier from the candidate mobile node.

13. The base station of claim 11, wherein at least one forward-link signal quality indication is conveyed using a pilot strength measurement message (PSMM).

14. The base station of claim 11, wherein the functions include determining the location of the candidate mobile node using Global Positioning System (GPS) technology.

15. The base station of claim 11, wherein determining that hard-handoff criteria are met for the candidate mobile node comprises receiving, from the candidate mobile node, a hard-handoff-criteria-met indication.

16. The base station of claim 15, wherein the hard-handoff-criteria-met indication comprises the location of the candidate mobile node.

17. The base station of claim 15, wherein the hard-handoff-criteria-met indication comprises a measurement of a forward-link signal quality of the first carrier as determined at the candidate mobile node.

18. The base station of claim 17, wherein the signal-quality threshold is the measurement of the forward-link signal quality of the first carrier.

19. In a wireless-communication network defining a plurality of wireless coverage areas for serving a plurality of mobile nodes on a plurality of carriers, wherein the wireless-communication network initially serves a candidate mobile node on a first carrier and serves a plurality of other mobile nodes on a second carrier, a method comprising:

tracking geographic locations of the plurality of mobile nodes served by the wireless-communication network;

receiving a hard-handoff-criteria-met indication from the candidate mobile node;

identifying a plurality of neighboring mobile nodes among the plurality of other mobile nodes, based at least in part on a comparison between the geographic location of the candidate mobile node and geographic locations of the neighboring mobile nodes;

receiving a plurality of measurements of a forward-link signal quality of a second carrier from at least the identified plurality of other mobile nodes;

estimating a forward-link signal quality of the second carrier at the location of the candidate mobile node, based on the measurements of the forward-link signal quality of the second carrier received from the neighboring mobile nodes; and if the estimated forward-link signal quality of the second carrier at the location of the candidate mobile node exceeds a signal-quality threshold, providing hard-handoff information about the second carrier to the candidate mobile node.

20. The method of claim 19, wherein the hard-handoff information about the second carrier is provided to the candidate mobile node without first receiving a measurement of the forward-link signal quality of the second carrier from the candidate mobile node.

21. The method of claim 19, wherein tracking geographic locations of the plurality of mobile nodes comprises using Global Positioning System (GPS) technology.

22. The method of claim 19, wherein tracking geographic locations of the plurality of mobile nodes comprises using triangulation.

* * * * *